United States Patent
Ho et al.

(10) Patent No.: US 8,316,256 B2
(45) Date of Patent: Nov. 20, 2012

(54) METHOD AND SYSTEM FOR SUPPLYING OUTPUT VOLTAGE TO GRAPHICS PROCESSING UNIT

(75) Inventors: Yu-Li (David) Ho, Taipei (TW); Li-Ling Chou, Banqiao (TW); Yu-Kuo Chiang, Banqiao (TW); Shany-I Chan, Taipei (TW); Pei-Hua Su, Taipei (TW); Li-Kai Cheng, Jhonghe (TW)

(73) Assignee: NVIDIA Corporation, Santa Clara, CA (US)

(*) Notice: Subject to any disclaimer, the term of this patent is extended or adjusted under 35 U.S.C. 154(b) by 402 days.

(21) Appl. No.: 12/635,592

(22) Filed: Dec. 10, 2009

(65) Prior Publication Data
US 2011/0145619 A1    Jun. 16, 2011

(51) Int. Cl.
*G06F 11/30* (2006.01)
*G06F 1/00* (2006.01)

(52) U.S. Cl. .................. 713/340; 713/300; 713/310

(58) Field of Classification Search .................. 713/340
See application file for complete search history.

(56) References Cited

U.S. PATENT DOCUMENTS

| | | | |
|---|---|---|---|
| 7,421,604 B1* | 9/2008 | Mimberg | 713/340 |
| 7,441,137 B1* | 10/2008 | Mimberg | 713/340 |
| 7,884,586 B2* | 2/2011 | Fabbro | 323/259 |
| 8,051,307 B2* | 11/2011 | Huang et al. | 713/300 |
| 2009/0212753 A1* | 8/2009 | Lou | 323/277 |

OTHER PUBLICATIONS

Intersil Americas Inc., ISL6549 Datasheet, Dec. 2004.

* cited by examiner

*Primary Examiner* — Suresh Suryawanshi
(74) *Attorney, Agent, or Firm* — Patterson & Sheridan, LLP

(57) ABSTRACT

The present invention sets forth a method and a system for powering a graphics processing unit (GPU) with a power supply subsystem. In one embodiment, the method includes generating an offset in response to an operating voltage need of the GPU; and applying the offset to information associated with a first operating voltage of the GPU; wherein the offset causes the first operating voltage to change to a second operating voltage of the GPU.

20 Claims, 5 Drawing Sheets

METHOD AND SYSTEM FOR SUPPLYING OUTPUT VOLTAGE TO GRAPHICS PROCESSING UNIT

BACKGROUND OF THE INVENTION

1. Field of the Invention

The present invention generally relates to graphics processing unit (GPU), and, more specifically, to a method and system for supplying an output voltage to a graphics processing unit.

2. Description of the Related Art

In a typical computer system, one or more power supply subsystems are configured to supply voltages to the various system components in the computer system. For example, a first power supply subsystem may supply a first voltage to a first processing unit (e.g., central processing unit), and a second power supply subsystem may supply a second voltage to a second processing unit (e.g., graphics processing unit) of a graphics subsystem within the computer system.

Pulse-width modulation (PWM) is one of the techniques utilized in the second power supply subsystem for a graphics processing unit (GPU). Specifically, this second power supply subsystem may adjust an output voltage to the GPU based on a PWM signal. To adjust the output voltage to the GPU, the second power supply subsystem may also include a feedback mechanism having a voltage divider to prepare a predetermined percentage of the output voltage to the GPU. The second power supply subsystem then compares this predetermined percentage of the output voltage with a reference voltage before generating the PWM signal. And the second power supply subsystem may further utilize the PWM signal to adjust the output voltage to the GPU. With usage of the voltage divider, the second power supply subsystem may introduce undesirable voltage spikes or voltage undershoots.

FIG. 1 illustrates an example computer system 100 having a PWM-based power supply subsystem 110 for providing an output voltage to a GPU 120. The power supply subsystem 110 comprises a voltage regulator 130, an error amplifier (EA) 140, a PWM circuit 150 having a gate logic 160, and a feedback (FB) circuit 164. The PWM circuit 150 may supply a first voltage signal 163 as an output voltage to the GPU 120. The FB circuit 164 may further include a voltage divider 165. The FB circuit 164 may be configured to receive the first voltage signal 163. With the voltage divider 165, the FB circuit 164 may prepare a feedback voltage signal 166, which is a predetermined percentage of the first voltage signal 163. And the feedback signal 166 may be received by the EA 140. The EA 140 is further configured to receive a second voltage signal 168 from the voltage regulator 130. The EA 140 may generate a difference signal 172 indicating a duty cycle according to the difference between the second voltage signal 168 and the feedback signal 166. The PWM circuit 150 may further receive the difference signal 172 before preparing the first voltage signal 163.

At least one disadvantage associated with the power supply subsystem 110 is the possibility of occurrences of voltage spikes or voltage undershoots during dynamic voltage change. As previously mentioned, the power supply subsystem 110 outputs the first voltage signal 163 according to the feedback signal 166 which is prepared solely based on the operation of the voltage divider 165. Therefore, regardless of how carefully the voltage divider 165 is designed, the feedback signal 166 may spike or undershoot as the result of the voltage divider 165. And the spike or undershoot may erroneously skew the difference signal 172, which further affects the output of the first voltage signal 163.

As the foregoing illustrates, what is needed in the art is thus a method and apparatus for providing a voltage to a GPU while reducing the likelihood of experiencing voltage spikes or voltage undershoots and address at least one of the foregoing issues.

SUMMARY OF THE INVENTION

One embodiment sets forth a method for powering a graphics processing unit (GPU) with a power supply sybsystem. The method includes generating an offset in response to an operating voltage need of the GPU; and applying the offset to information associated with a first operating voltage of the GPU; wherein the offset causes the first operating voltage to change to a second operating voltage of the GPU.

One advantage of the disclosed method is to provide a steady control of the GPU voltage by compensating the feedback voltage with the offset voltage. Therefore, the difference between the sum of the feedback voltage and the offset voltage with the reference voltage could only increase or decrease by one offset voltage at one iteration, minimizing a likelihood of voltage spike or undershoot, before a target voltage level of the GPU voltage could be reached.

BRIEF DESCRIPTION OF THE DRAWINGS

So that the manner in which the above recited features of the present invention can be understood in detail, a more particular description of the invention, briefly summarized above, may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

DETAILED DESCRIPTION

Figure 1:
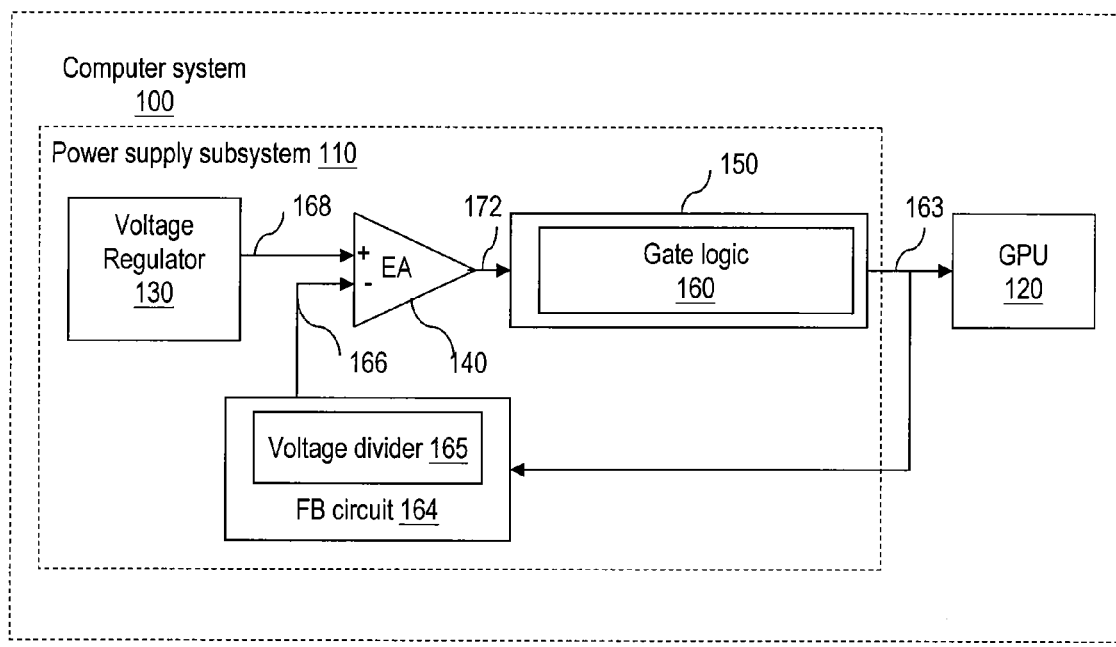
FIG. 1 illustrates an example computer system having a graphics processing subsystem using a PWM circuit for providing a voltage output to a GPU in accordance with the prior art.
Figure 2:
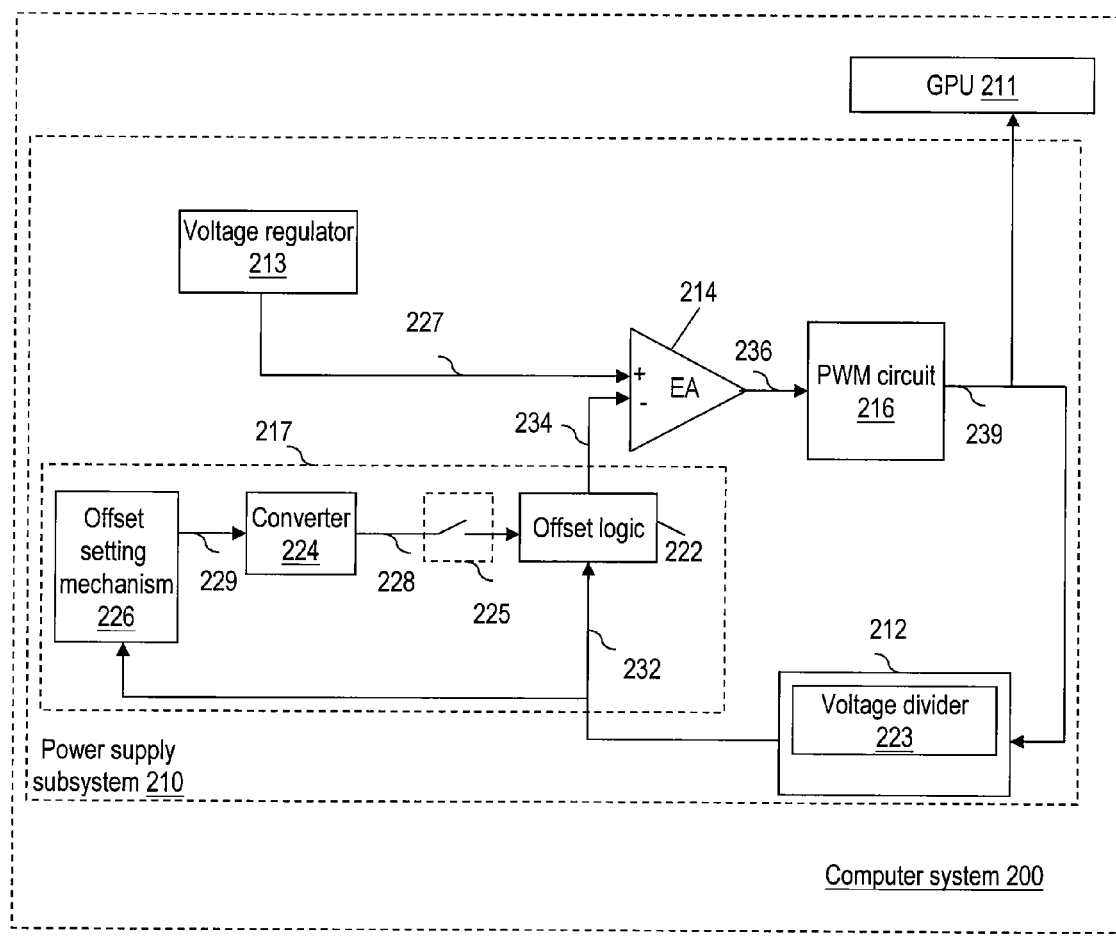
FIG. 2 is a simplified block diagram illustrating an example computer system in accordance with one embodiment of the present invention.

FIG. 2 is a simplified block diagram illustrating an example computer system 200 in accordance with one embodiment of the present invention. The computer system 200 includes a PWM-based power supply subsystem 210 and a graphics processing unit (GPU) 211. The power supply subsystem 210 is configured to provide power to the GPU 211. The power supply subsystem 210 includes a feedback (FB) circuit 212, a voltage regulator 213, an error amplifier (EA) 214, a pulse-width modulation (PWM) circuit 216, and a GPU voltage adjusting mechanism 217. The FB circuit 212 includes a voltage divider 223. The GPU voltage adjusting mechanism 217 includes an offset logic 222, a converter 224, a switch 225, and an offset setting mechanism 226.

The voltage regulator 213 is configured to generate a reference voltage 227 to the EA 214. In one implementation, the EA 214 receives the reference voltage 227 at a positive terminal (+) thereof. The EA 214 further receives an offset logic output 234 at a negative terminal (−) thereof. The EA 214 is configured to output a difference signal 236 indicative of a difference between the reference voltage 227 and the offset logic output 234. In one implementation, the difference signal 236 is a pulse signal. The duty ratio of the pulse signal 236 may further dictate a GPU voltage 239 outputted by the PWM circuit 216.

Before the switch turns on (i.e., the GPU is operating at a first operating state), the switch 225 is not turned on and the offset logic 222 is configured to let a feedback voltage 232 passed and use the feedback voltage 232 as an offset logic output 234. In addition, the offset logic output 234 equals to the reference voltage 227, and the difference between the reference voltage 227 and the offset logic output 234 is zero. Therefore, the GPU voltage 239 remains at a first constant.

When the GPU switches from a first operating state to a second operating state, the switch 225 is turned on and the GPU voltage adjusting mechanism 217 is configured to provide an offset voltage 228 to the offset logic 222. In one implementation, the switch 225 is turned on through software by means of a general purpose input/output (GPIO) signal.

The offset setting mechanism 226 is configured to receive a feedback voltage 232. The feedback voltage 232 may be compared to a target value associated with the second operating state of the GPU 211, wherein the target value may be predetermined. The offset setting mechanism output 229 is based on the comparison. The output 229 may be converted to an offset voltage 228 by the converter 224. The converter 224 may be a digital to analog converter or an analog to analog converter. In one implementation, the offset voltage 228 is a predetermined percentage of the feedback voltage 232. It is worth noting that the offset voltage 228 may be positive or negative, which can be predetermined.

The difference signal 236 of a first duty ratio may increase the GPU voltage 239 to the GPU. Such difference signal 236 may correspond to a positive difference between the reference voltage 227 and the offset logic output 234. In one implementation, the positive difference indicates the reference voltage 227 is larger than the offset logic output 234. On the other hand, the difference signal 236 of a second duty ratio may decrease the GPU voltage 239. The difference signal 236 of the second duty ratio may be generated when the offset logic output 234 is larger than the reference voltage 227.

The GPU voltage 239 may be received by the voltage divider 223. The feedback voltage 232 may be proportional to the GPU voltage 239.

For illustration, the first operating state may be a high-performance operating state and the second operating state may be a normal operating state. The on/off of the switch 225 may be controlled by software (e.g., an operating system of the computer system 200). The GPU may require a first power supply to operate at the high-performance operating state and a second power supply in order to operate at the normal operating state. For example, the GPU 211 may require a power supply of 1.5 volts in order to operate at the normal operating state while requiring 2.0 volts in order to operate at the high-performance operating state.

The power supply subsystem 210 may be configured to increase the GPU voltage 239 (e.g., from 1.5 volts to 2.0 volts) when the GPU 211 switches from the normal operating state to the high-performance operating state. The power supply subsystem 210 may be also configured to decrease the GPU voltage (e.g., from 2.0 volts to 1.5 volts) when the GPU 211 switches from the high-performance operating state to the normal operating state. Using the above-mentioned example, when the GPU 211 operates in the normal operating state, the GPU 211 may require the power supply of the GPU voltage 239 of 1.5 volts. Assume the GPU 211, when powered on, is configured to operate at the normal operating state to start with. When the GPU 211 switches to the high-performance operating state, the switch 225 may be turned on. For illustration only, when the switch 225 is turned on, the GPU voltage 239 may be at 1.5 volts, the feedback voltage 232 may be at 0.75 volts, the offset voltage 228 may be at 0.2 volts, and the reference voltage 227 may be at 0.75 volts. It is worth noting that the reference voltage 227 is substantially the same as the feedback voltage 232 before the switch 225 is turned on. In addition, before the switch is turned on, the offset logic 222 may be configured to store the value of the original feedback voltage 232. In one implementation, the offset logic 222 may not store the values of the feedback voltage 232 after the switch is turned on and the offset voltage 228 is applied to the offset logic 222. After the switch is turned on, the offset logic 222 may also be configured to store the value of the offset voltage 228. The offset logic output 234 may be the sum of the feedback voltage 232 and the offset voltage 228.

Once the switch 225 is turned on, the offset logic 222 may apply a negative offset voltage 228 (e.g., −0.2 volts) to the stored feedback voltage 232 of 0.75 volts. Thus, the offset logic output 234 may become +0.55 volts. Therefore, the difference signal 236 could be of a duty ratio that may increase the GPU voltage 239 because of the positive difference between the reference voltage 227 and the offset logic output 234. The GPU voltage 239 may keep increasing to a target voltage (e.g., 2 volts). At that time, the feedback voltage 232 may become 1 volt because of the voltage divider 223. As set forth above, the offset voltage 228 may be a predetermined percentage of the feedback voltage 232. For illustration only, in one implementation, the offset voltage 228 may be −0.25 volts when the feedback voltage 232 is 1 volt. The resulting offset logic output 228 is 0.75 volts. Therefore, no difference signal 236 may be generated to further increase the GPU voltage 239.

Since it is likely that the GPU voltage 239 may not reach a target level (such as 2.0 volts) in a single iteration, multiple iterations may be necessary. For example, when the first iteration results in the GPU voltage 239 of 1.8 volts and the feedback voltage 232 of 0.9 volts, the power supply subsystem 210 may apply the negative offset voltage (e.g., −0.225 volts) to the feedback voltage of 0.9 volts. Thus, the offset logic output 228 may become 0.675 volts and the difference signal 236 may further increase GPU voltage 239 to 2.0 volts.

It is worth noting that the offset logic output 234 may exceed the reference voltage 227 during any iteration. In that situation, the difference signal 236 may cause the GPU voltage 239 to decrease. The decreased GPU voltage 239 may reduce the feedback voltage 232, and the reduced feedback voltage 232 may in turn reduce the offset voltage 228. Through multiple iterations, logic output 234 and the difference signal 236. Thus, the difference signal 236 could be returning to zero, indicating that the decreased GPU voltage 239 is at the target voltage level. The offset voltage 228 may remain at a constant when the GPU voltage 239 is at the target voltage level.

Continuing the usage of the example discussed in the preceding paragraphs, when the GPU 211 switches from the high-performance operating state to the normal operating state, the offset setting mechanism 226 may generate a new output 229 which can be converted to a new offset voltage 228 by the converter 224. The new offset voltage 228 may be positive, which is opposite to the offset voltage 228 generated when the GPU 211 switches from the normal operating state to the high-performance operating state.

Figure 3:
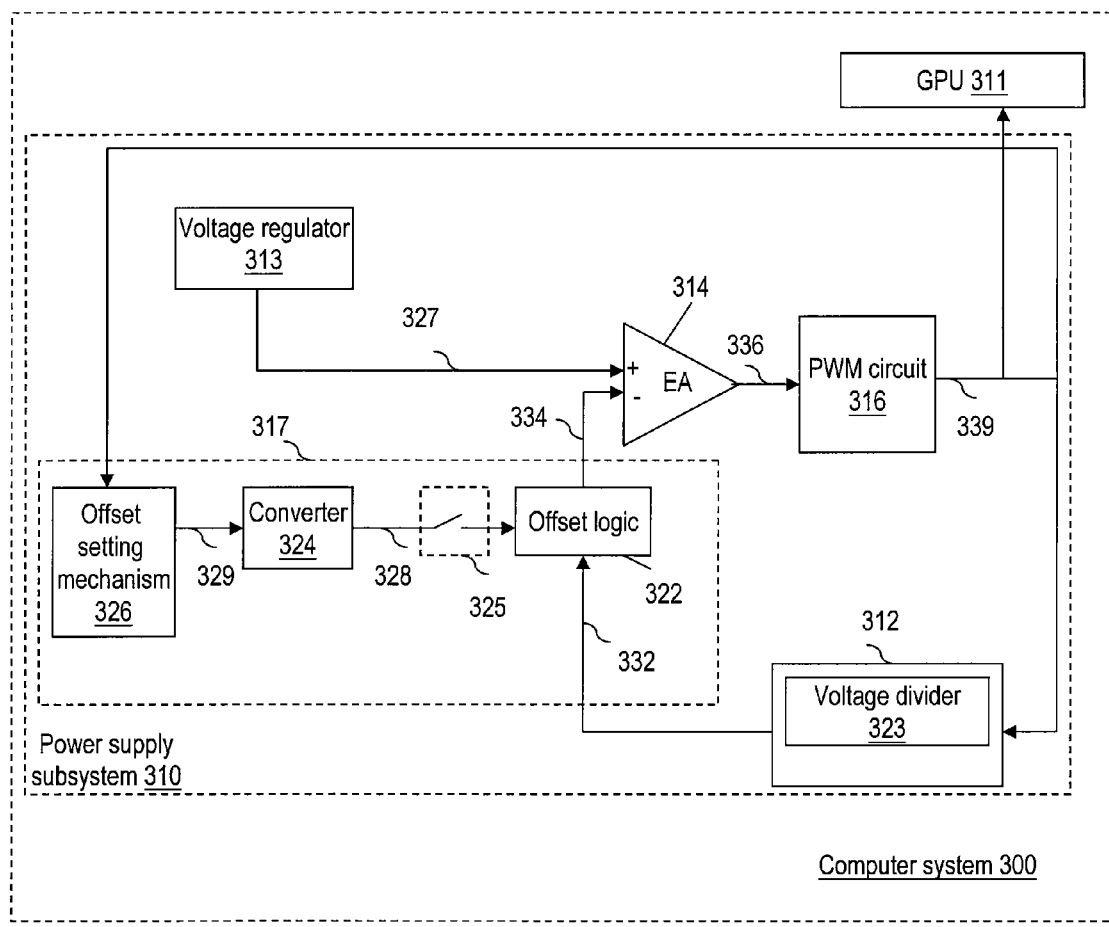
FIG. 3 is a simplified block diagram illustrating an example computer system in accordance with one embodiment of the present invention.

FIG. 3 is a simplified block diagram illustrating an example computer system 300 in accordance with one embodiment of the present invention. The computer system 300 includes a PWM-based power supply subsystem 310 and a graphics processing unit (GPU) 311. The power supply subsystem 310 is configured to provide a power supply for the GPU 311. The power supply subsystem 310 further includes a feedback (FB) circuit 312, a voltage regulator 313, an error amplifier (EA) 314, a pulse-width modulation (PWM) circuit 316, a GPU voltage adjusting mechanism 317, and a voltage source 318. The FB circuit 312 includes a voltage divider 323. The GPU voltage adjusting mechanism 317 includes an offset logic 322, a converter 324, a switch 325, and an offset setting mechanism 326 coupled to the voltage source 318.

The voltage regulator 313 is configured to generate a reference voltage 327. The EA 314 is configured to receive the reference voltage 327. In one implementation, the EA 314 receives the reference voltage 327 at a positive terminal (+) thereof. The GPU voltage adjusting mechanism 317 is configured to provide an offset voltage 328 to the offset logic 322 when the switch 325 is turned on. The offset voltage 318 may be positive or negative and be predetermined. The offset voltage 328 may be generated based on the GPU voltage 339. The output 329 of the voltage source 326 may be converted to the offset voltage 328 by the converter 324. In one implementation, the converter 324 is a digital to analog converter. In another implementation, the converter 324 is an analog to analog converter.

The offset logic 322 is configured to receive a feedback voltage 332 based on the GPU voltage 339, and the offset voltage 328 when the switch 325 is turned on. The switch 325 may be turned on through software by means of a GPIO signal. The offset logic output 334 may be the sum of the offset voltage 328 and the feedback voltage 332. As set forth above, the offset voltage 328 may be positive or negative. The determination of generating a positive offset voltage 328 or a negative offset voltage 328 may be based on the GPU voltage 339, the feedback voltage 332, and a target voltage. The offset may be a variable proportional to a difference between the feedback voltage 332 and the reference voltage 327.

The EA 314 may be configured to receive the offset logic output 334 at a negative terminal (−) thereof. The EA 314 is configured to output a difference signal 336 indicative of a difference between the reference voltage 327 and the offset logic output 334. In one implementation, the difference signal 336 is a pulse signal. And a duty ratio of the pulse signal may further dictate a GPU voltage 339 outputted by the PWM circuit 316.

The GPU 311 may be configured to operate at different operating states requiring different power supplies by the power supply subsystem 310. In one implementation, the GPU 311 may operate at a normal operating state. In another implementation, the GPU 311 may operate at a high-performance operating state. Assume the GPU 311 operates at the normal operating state to begin with. When the GPU 311 is to operate at the high-performance operating state, the power supply subsystem 310 may provide a relatively large GPU voltage 339 to the GPU 311. To do so, the power supply subsystem 310 may turn on the switch 325. When the switch 325 is turned on, the offset logic 322 may receive an offset voltage 328 and a feedback voltage 332. The offset logic 322 may add the offset voltage 328 and the feedback voltage 332 together as an output 334. The offset voltage 328 may be negative when the GPU voltage 339 is smaller than the target voltage. On the other hand, the offset voltage 328 may be positive when the GPU voltage 339 is greater than the target value.

The GPU voltage 339 and the feedback voltage 332 may vary because the difference between the reference voltage 327 and the offset logic output 334. However, the offset logic output 332 also changes based on the feedback voltage. Through one or more iterations, the GPU voltage 339 may equal to the feedback voltage 332, and the GPU voltage 339 remains constant.

Figure 4:
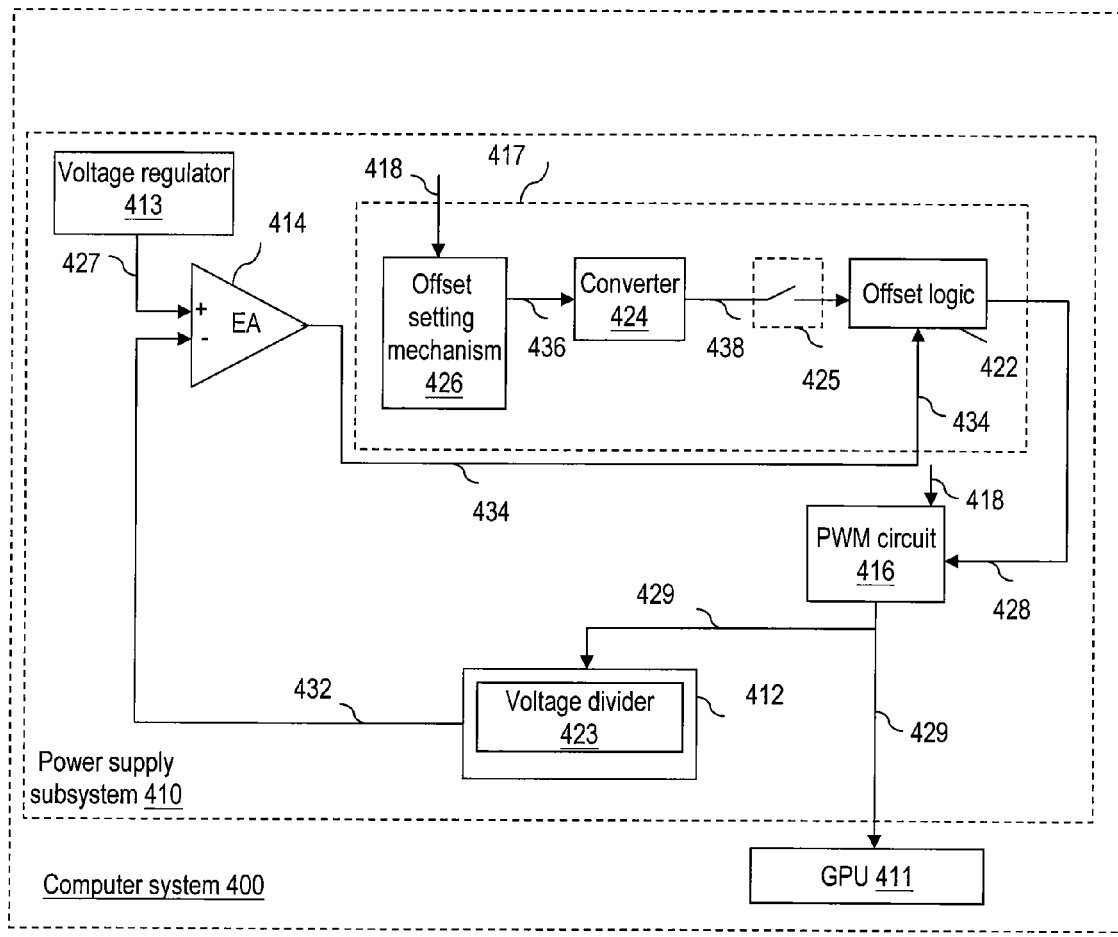
FIG. 4 is a simplified block diagram illustrating an example computer system in accordance with one embodiment of the present invention.

FIG. 4 is a simplified block diagram illustrating an example computer system 400 in accordance with one embodiment of the present invention. The computer system 400 includes a PWM-based power supply subsystem 410 and a graphics processing unit (GPU) 411. The power supply subsystem 410 is configured to provide a power supply for the GPU 411. The power supply subsystem 410 further comprises a feedback (FB) circuit 412, a voltage regulator 413, an error amplifier (EA) 414, a pulse-width modulation (PWM) circuit 416, a GPU voltage adjusting mechanism 417, a first voltage source 418. The FB circuit 412 includes a voltage divider 423. The GPU voltage adjusting mechanism 417 includes an offset logic 422, a converter 424, a switch 425, and an offset setting mechanism 426 coupled to the first voltage source 418. In one implementation, the converter 424 is a digital-to-analog converter. In another implementation, the converter 424 is an analog-to-analog converter.

The voltage regulator 413 is configured to generate a reference voltage 427. The EA 414 is configured to receive the reference voltage 427. In one implementation, the EA 414 receives the reference voltage 427 at a positive terminal (+) thereof. The GPU voltage adjusting mechanism 417 is configured to provide information of an offset duty ratio voltage 428 to the PWM circuit 416. Therefore, the PWM circuit 416 may generate a GPU voltage 429 to the GPU 411. The GPU voltage 429 may be further received by the FB circuit 412 and the FB circuit 412 may thus generate a feedback voltage 432 with the voltage divider 423 based on the GPU voltage 429. In one implementation, the feedback voltage 432 is a predetermined percentage of the GPU voltage 429. The feedback voltage 432 may be received by the EA 414. In one implementation, the feedback voltage 432 is received at a negative terminal (−) of the EA 414.

The first offset duty ratio 428 may be prepared by the offset logic 422, which receives a difference duty ratio signal 434 indicating a difference between the feedback voltage 432 and the reference voltage 427 and a second offset duty ratio 438 when the switch 425 is turned on. The switch 425 may be turned on when any adjustment to the GPU voltage 429 becomes necessary due to the GPU 411 is required to operate at a different operating state. The first offset duty ratio 428 may be the sum of the second offset duty ratio and the difference duty ratio signal 434. The second offset duty ratio 438 is converted from an output 436 of an offset setting mechanism 426 by a converter 424. In one implementation, the difference signal 434 is a pulse signal and a duty cycle of the pulse signal is indicative of a first duty ratio. The PWM circuit 416 may be coupled to the first voltage source 418. With the first offset duty ratio 428, the PWM circuit 416 may also calculate a second duty ratio associated with the GPU voltage 429. The PWM circuit 416 may be configured to adjust the second duty ratio on basis of the received offset duty ratio. In one implementation, the offset duty ratio may be added to the first duty ratio associated with the difference signal 434. In another implementation, the first duty ratio may be deducted by the offset duty ratio. The adjusted second duty ratio may in turn adjust the GPU voltage 429.

In one implementation, the GPU voltage adjusting mechanism 217, 317, and 417 may be on the path of the reference voltage 227, 327, and 427, respectively. The GPU voltage adjusting mechanism may apply an offset to the reference voltage. Based on the difference between the reference voltage, which has been applied the offset voltage, and the feedback voltage. The GPU voltage may switch from a first voltage to a second voltage.

Figure 5:
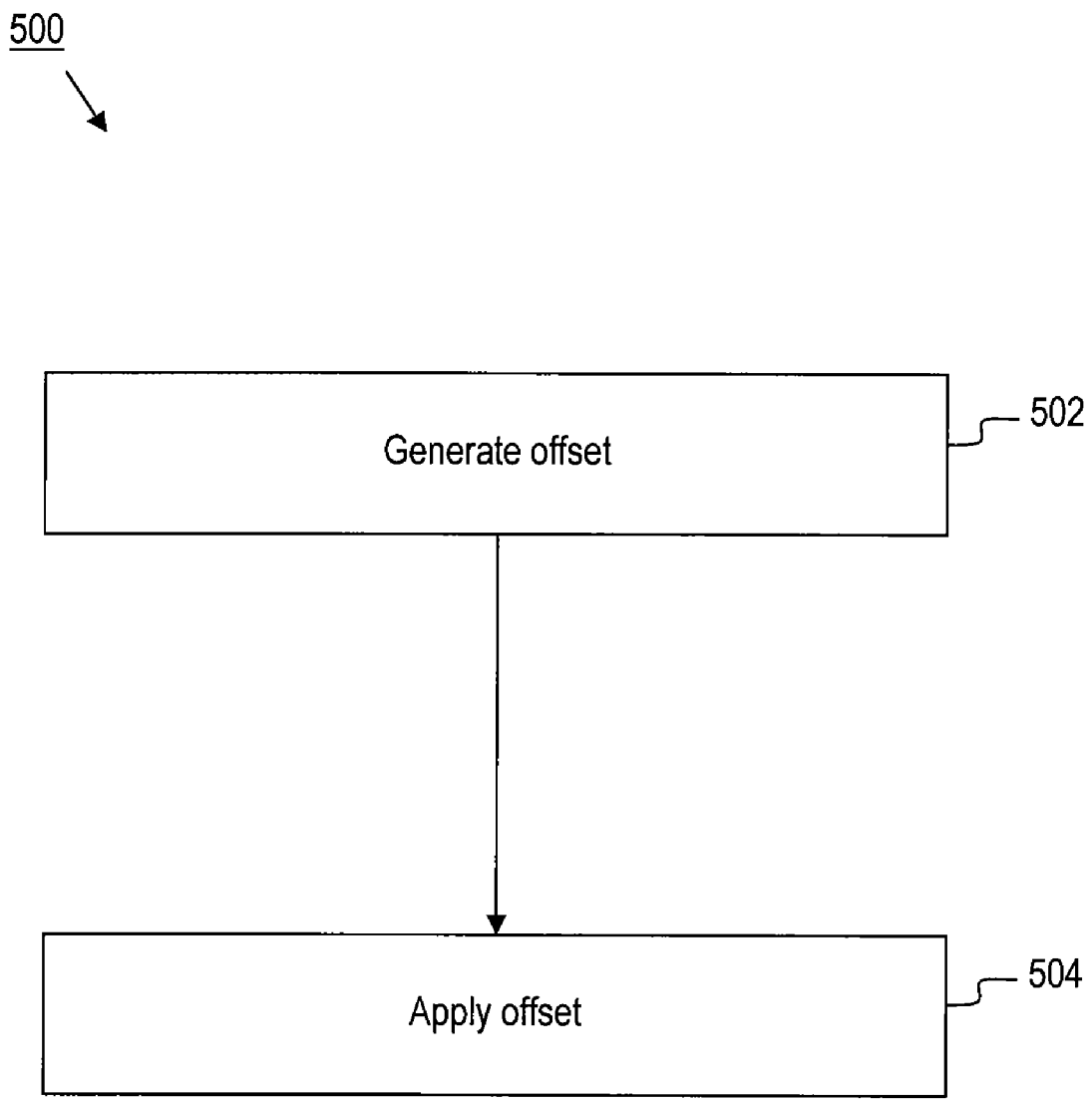
FIG. 5 is a flowchart illustrating example operations performed by a PWM-based power supply subsystem for a GPU in accordance with one embodiment of the present invention.

FIG. 5 is a flowchart illustrating example operations performed by a PWM-based power supply subsystem for a GPU in accordance with one embodiment of the present invention. In step 502, an offset is generated in response to an operating voltage need of the GPU. The GPU may be configured to switch from a first operating state to a second operating state. The first operating state may require a first operating voltage and the second operating state may require a second operating voltage.

In step 504, the offset is applied to information associated with the first operating state. The information may be a voltage or a duty cycle ratio. As set forth above, the offset may cause a voltage change from the first operating voltage to the second operating voltage.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A method for powering a graphics processing unit (GPU) with a power supply subsystem, comprising:
   generating an offset based on a feedback voltage that indicates a current voltage of the GPU;
   summing the offset with the feedback voltage to generate a summed voltage; and
   determining that an operating voltage of the GPU needs to change from the current voltage to a second voltage based on a difference between the summed voltage and a reference voltage.

2. The method of claim 1, wherein the offset is positive or negative.

3. The method of claim 1, further comprising generating the reference voltage.

4. The method of claim 3, wherein the offset is generated based on the feedback voltage and the second operating voltage.

5. The method of claim 3, wherein the offset is a percentage of the feedback voltage.

6. The method of claim 3, wherein the offset is a variable proportional to a difference between a percentage of the feedback voltage and the reference voltage.

7. The method of claim 3, wherein the offset is a difference of a percentage of the second operating voltage and the reference voltage.

8. The method of claim 3, wherein the offset is generated based on a ratio of a percentage of the feedback voltage and the reference voltage.

9. The method of claim 8, wherein the offset is associated with a duty cycle signal.

10. The method of claim 9, wherein the duty cycle signal is used by a pulse-width modulation circuit.

11. A computing system comprising:
    a graphics subsystem having a graphics processing unit (GPU); and
    a power supply subsystem having:
       a GPU voltage adjusting mechanism that comprises:
          an offset setting mechanism for providing a predetermined offset,
          a switch coupled to the offset setting mechanism, and
          an offset logic coupled to the switch, and
       a voltage divider for receiving a first voltage and outputting a feedback information associated with the first voltage,
    wherein the GPU requires the first voltage to operate at a first operating state, and
    wherein the offset logic is configured to apply the predetermined offset to the feedback information when the switch is turned on in response to the GPU switching from the first operating state to a second operating state.

12. The computing system of claim 11, wherein the offset is a voltage.

13. The computing system of claim 12, wherein the offset is a percentage of the feedback information.

14. The computing system of claim 13, further comprising an error amplifier to generate a signal based on the difference between a reference voltage and the sum of the offset and the feedback information.

15. The computing system of claim 12, wherein the offset is based on the first voltage, a target voltage, and the feedback information.

16. The computing system of claim 11, wherein the offset is a duty cycle.

17. The computing system of claim 16, wherein the offset is generated based on a ratio of a reference voltage and the feedback information, and a target duty cycle.

18. A computing system comprising:
    a graphics subsystem having a graphics processing unit (GPU); and
    a power supply subsystem having:
       a GPU voltage adjusting mechanism that comprises:
          an offset setting mechanism for providing a predetermined offset,
          a switch coupled to the offset setting mechanism, and
          an offset logic coupled to the switch,
       wherein the power supply subsystem further comprises a voltage regulator for providing a reference voltage, and
       wherein the offset logic is configured to apply the predetermined offset to the reference voltage when the switch is turned on in response to the GPU to switch from a first operating state to a second operating state.

19. The computing system of claim 18, further comprising a voltage divider for receiving a voltage associated with the operating voltage of the GPU and outputting a feedback information associated with the voltage.

20. The computing system of claim 19, wherein the feedback information is compared to the sum of the reference voltage and the offset.

* * * * *